May 19, 1970     W. SCHÄFER     3,512,618

ELECTRIC BRAKE WITH PERMANENT MAGNET

Filed Aug. 22, 1968     6 Sheets-Sheet 1

INVENTOR.
WOLFGANG SCHÄFER

BY

ATTORNEY

INVENTOR.
WOLFGANG SCHÄEFER
BY
ATTORNEY

May 19, 1970   W. SCHÄFER   3,512,618
ELECTRIC BRAKE WITH PERMANENT MAGNET
Filed Aug. 22, 1968   6 Sheets-Sheet 5

INVENTOR.
WOLFGANG SCHÄEFER
BY
ATTORNEY

INVENTOR.
WOLFGANG SCHÄFER
BY
ATTORNEY

United States Patent Office 3,512,618
Patented May 19, 1970

3,512,618
ELECTRIC BRAKE WITH PERMANENT MAGNET
Wolfgang Schäfer, 5 Goethestrasse,
7481 Laiz, Sigmaringen, Germany
Continuation-in-part of application Ser. No. 636,134,
May 4, 1967. This application Aug. 22, 1968, Ser.
No. 764,002
Int. Cl. B60t *13/02;* F16d *27/08*
U.S. Cl. 188—161                                    8 Claims

ABSTRACT OF THE DISCLOSURE

Apparatus utilizing a drive or fixed assembly having at least two stable working positions in combination with one or more pulsed electromagnets for alternatively positioning the drive assembly in said stable positions to control the relative motion between a first and a second power assembly. In general, apparatus embodying this invention comprises oppositely acting electromagnetic means utilized to move a power assembly which includes a permanent magnet, alternately into engagement with a first force transmitting assembly, such as a clutch, associated with a power source and a second force transmitting assembly, such as a braking assembly. In one embodiment, the drive assembly is shaped so as to afford a portion of a closed magnetic path for the permanent magnet when the drive assembly is in abutment with the first force transmitting assembly and a portion of an alternate closed magnetic path when the drive assembly abuts the second force transmitting assembly.

---

This is a continuation-in-part of U.S. Ser. No. 636,134, filed May 4, 1967, now abandoned.

BACKGROUND

In many industrial areas, it is necessary to rapidly engage and disengage a prime mover from a drive shaft, often in a cyclic manner. For instance, in weaving apparatus it is necessary to rapidly reverse the rotation of the shaft; while, in certain machine tools, it is necessary to closely control the alternating periods during which a driven shaft is in a dynamic condition and is at rest. In view of the extensive ultilization of such apparatus, it is not surprising that many types of structure have been suggested for this purpose. It is, for instance, not uncommon to utilize electromagnets, with or without ancillary permanent magnets, to initiate and hold contact between clutching elements through which rotary power is transmitted to a shaft. Such electromagnets are advantageous in such circumstances inasmuch as they may be controlled conveniently by computers, or otherwise, and are capable of substantially instant response to an incoming signal. Unfortunately, however, it has been found that when this type of mechanism is utilized for this purpose, relatively large amounts of electric energy are used with a corresponding increase in heat generation by the system. Moreover, when alternating current is used to control the electromagnets, it is necessary to employ relatively expensive laminations in the cores of the electromagnets. Until the present invention, a satisfactory apparatus for controlling the motion of a rotating shaft being driven by a prime mover which will operate with minimum current requirements and which can be fabricated at minimum expense has remained an elusive desideratum.

SUMMARY OF INVENTION

In a broad aspect, the present invention contemplates the utilization of a drive assembly which includes a permanent magnet to control the transmission of force in combination with pulsed electromagnetic means which functions to adjust the position of the drive assembly into alternate stable working positions.

DESCRIPTION OF DRAWINGS

Specific embodiments of the present invention are disclosed in the accompanying drawings wherein.

DETAILED DESCRIPTION OF THE APPARATUS SHOWN IN FIG. 1

Figure 1:
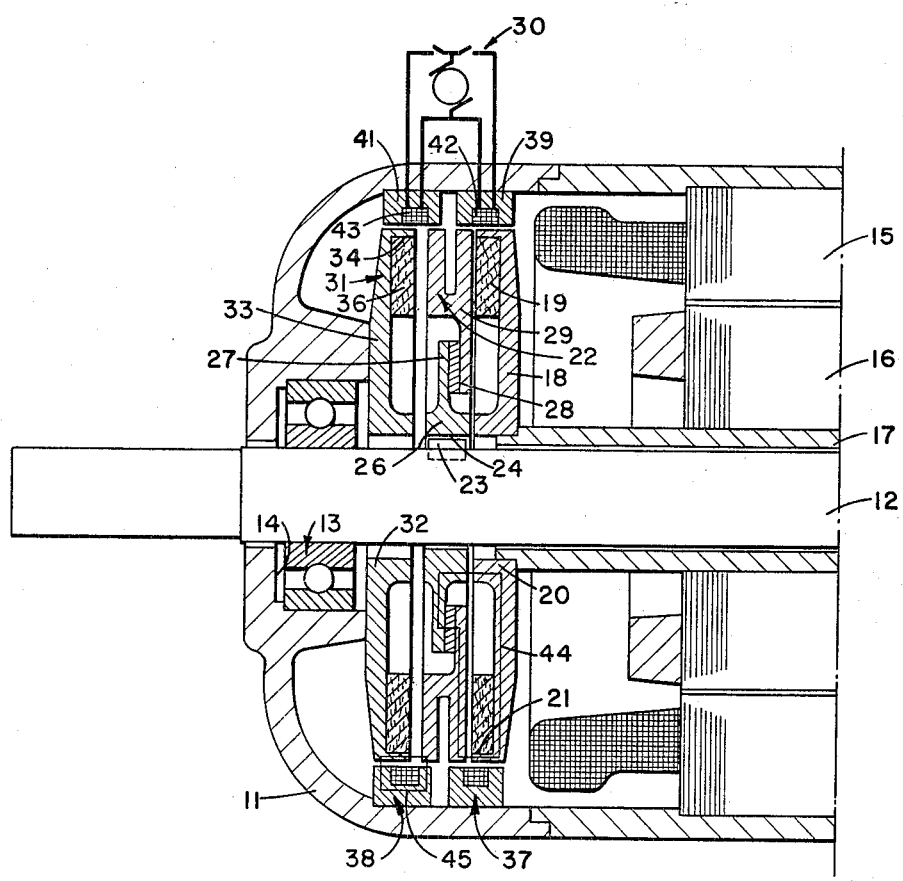
FIG. 1 is a cross-sectional view of apparatus useful for alternately braking and driving a rotating shaft.

Turning now to the drawings and particularly to FIG. 1, there is shown a fixed housing 11 from which protrudes a rotary shaft 12. A bearing assembly 13 is provided within a countersunk portion 14 formed within housing 11, and functions to allow relative rotary motion between shaft 12 and the housing. A prime mover (only partially shown in the drawing) including a field coil 15 and a rotor 16 is provided within housing 11 for rotating shaft 12. Rotor 16 has a common axis of rotation with shaft 12 and is fixed to a sleeve 17 which slidingly receives the shaft which is free to rotate therein.

Secured to one end of sleeve 17 is a first force transmitting assembly which includes a hub 20 on which is mounted or formed a clutch carrier plate 18. A circular clutch facing 19 is fixed at the outer periphery of carrier plate 18 adjacent a hoop-like extension 21 which projects from the outer edge of the plate. The carrier plate, the clutch facing and the sleeve, all form a rigid unit which moves with rotor 16.

Energy is transmitted from the clutch facing to a drive assembly indicated generally by the numeral 22 which is secured to shaft 12 in such a manner as to allow limited longitudinal motion along the shaft while at the same time forming a rotary drive connection with the shaft. In the embodiment shown, the means for securing the drive assembly to shaft 12 comprises a key 23 which is rigidly secured to shaft 12 and which projects into an enlarged keyway 24 formed in the annular portion of a hub 26 which forms a portion of drive assembly 22. Projecting outwardly from hub 26 is a disc 27 which carries on one side thereof a permanent magnet 28. At the opposite side of magnet 28 is secured a clutch-brake engaging member 29 which, in the embodiment shown, has a cross-section configuration approximating that of an "h."

A second force transmitting assembly, which may be either a clutch or brake assembly and which is indicated generally by the numeral 31, is secured to fixed housing 11 adjacent drive assembly 22 and includes a hub 32 which surrounds shaft 12. Projecting outwardly from hub 32 is a disc element 33 on the outer edge of which is located a hoop-like extension 34. Adjacent the shoulder formed between extension 34 and disc element 33 is a circular brake shoe 36 which is positioned to engage member 29.

As mentioned previously, drive assembly 22 is free for limited longitudinal motion with respect to shaft 12. The means for providing this motion includes a pair of circular electromagnets 37 and 38 which comprise yoke irons 39 and 41, which need not be laminated but may be formed of massive iron, and field coils 42 and 43, respectively. Electromagnets 37 and 38 are carried by the interior of fixed housing 11 so that, when pulsed, electromagnet 38 moves drive assembly 22 into engagement with brake assembly 31. Alternately when electromagnet 37 is pulsed it moves the drive assembly into engagement with clutch facing 19. Suitable electrical control means, indicated generally by the numeral 30, is provided for alternately pulsing the electromagnets.

It will, of course, be understood that the force generated by these electromagnets is sufficient to overcome the force tending to maintain the drive assembly in position due to the presence of permanent magnet 28. One of the force paths arising from the presence of the permanent magnet is shown by the lines indicated by the numeral 44 in FIG. 1 wherein it may be seen that the path includes clutch-brake engagement member 29, extension 21, plate 18, hubs 20 and 26, disc 27 and permanent magnet 28. A similar force pattern is established with brake assembly 31 when the drive assembly is in its alternate position. A similar example can be shown for the force pattern momentarily established by the electromagnets. A typical pattern is indicated by numeral 45 in FIG. 1 wherein it may be seen that the magnetic lines of force from the electromagnet 38 pass through the yoke iron 41, loop extension 34, clutch-brake engagement member 29 and back to the yoke iron. It is understood, of course, that, aside from the electromagnetic coils, those portions of the structure shown or described in this application as transmitting magnetic lines of force will include sufficient ferromagnetic material for this purpose.

OPERATION OF THE APPARATUS SHOWN IN FIG. 1

The apparatus disclosed thus far is useful for starting and stopping a rotary shaft in the following manner. We will assume that the elements are initially in approximately the position shown in FIG. 1, except that permanent magnet 28 is holding drive assembly 22 in direct contact with clutch facing 19. When the elements are in this position, electromagnets 37 and 38 are de-energized and rotary motion is transmitted from rotor 16 through sleeve 17, hub 20, clutch carrier plate 18, and clutch facing 19 to drive assembly 22. Motion of the drive assembly is in turn transmitted to shaft 12 through key 23. At such time as it is desired to interrupt the flow of mechanical power to the shaft, and at the same time stop the shaft, electromagnet 38 is pulsed by means 30 with an electrical signal to move drive assembly 22 to the left, as viewed in FIG. 1. During initial movement of the drive assembly the lines of force indicated by the numeral 44 are broken and, as the drive assembly nears brake assembly 41, similar lines of force are established between the drive and brake assemblies. Drive assembly 22 then engages brake shoe 36 to overcome the rotary inertia in shaft 12 and in the drive assembly. At about the same time, the incoming electric pulse to electromagnet 38 is discontinued and thereafter the shaft is held in a stationary position due to the action of permanent magnet 28 acting on the brake and drive assemblies. When it is desired to re-establish rotary motion in the shaft, the above sequence is reversed by pulsing electromagnet 37 to move the drive assembly to the right into engagement with rotating clutch facing 19.

DETAILED DESCRIPTION OF THE APPARATUS SHOWN IN FIG. 2

Figure 2:
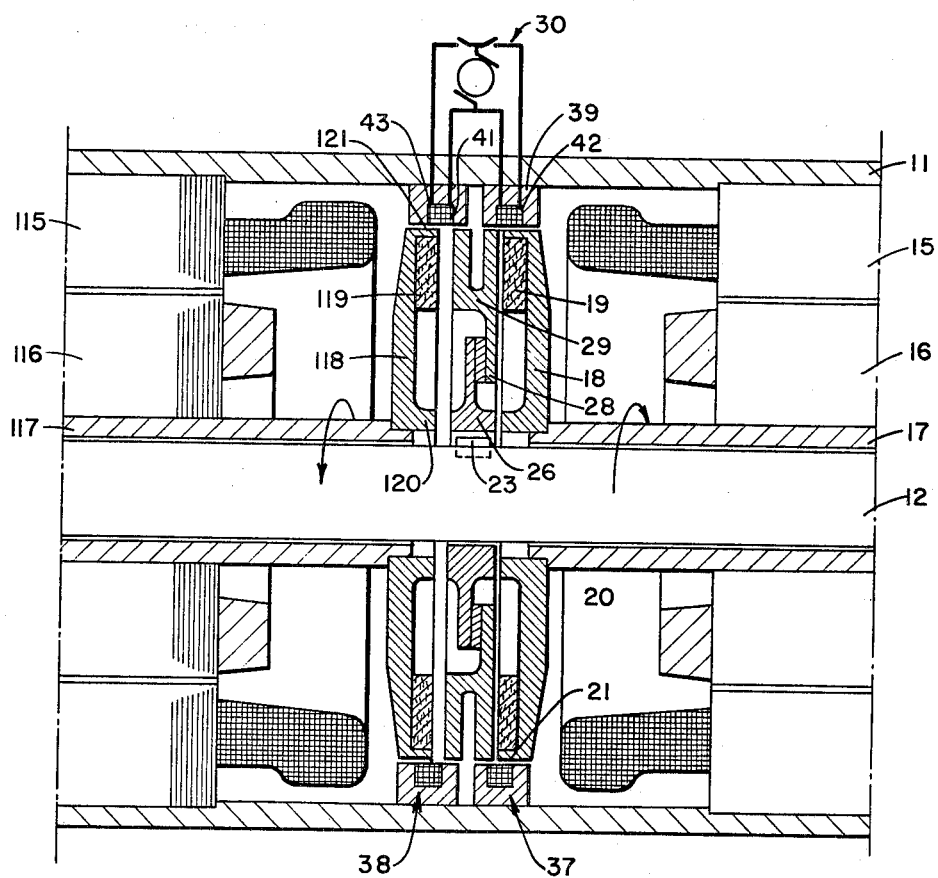
FIG. 2 is a cross-sectional view similar to FIG. 1 wherein a device is shown for alternately transmitting the motion of a pair of oppositely rotating rotors to a shaft.

In addition to being able to provide alternately driven and stopped motion, the present invention has utility in changing the rate or direction of motion transmitted to a shaft. One form of apparatus for utilizing this invention when the desired change is a change in direction is shown in FIG. 2. In FIG. 2 elements which correspond to the elements of FIG. 1 have been assigned the same numerical designation. Since these elements correspond both in structure and in function to the elements of FIG. 1, they will not be described hereinafter in further detail.

Instead of the brake assembly 31 which is disclosed in FIG. 1 an additional prime mover is shown in FIG. 2 as having a field coil 115 and a rotor 116 which, in the embodiment shown, is driven in a direction opposite to that of rotor 16; although, such a rotor could be used to provide motion in the same direction but at a different speed. Motion from rotor 116 is transmitted through a sleeve 117 and a hub 120 to a clutch carrier plate 118 which corresponds in function and design to plate 18. Similarly, a hoop-like extension 121 is provided at the outer edge of plate 118 and forms a shoulder therewith to receive a clutch facing 119.

OPERATION OF THE APPARATUS SHOWN IN FIG. 2

The apparatus shown in FIG. 2 is useful in providing rapidly reversing motion to a driven shaft as follows. Initially, assume that the structural elements are positioned so that clutch facing 19 is held in engagement with drive assembly 22 by magnet 28 whereby motion is transmitted to shaft 12 in a first direction from rotor 16. When it is desired to reverse the direction of shaft 12, electromagnet 38 is pulsed to move drive assembly 22 to the left into engagement with clutch facing 119 which is being rotated from rotor 116 in a direction opposite to the rotation of clutch facing 19. As drive assembly 22 is held by magnet 28 against clutch facing 119, reversed motion is transmitted through the drive assembly and key 23 to the shaft, whereupon the incoming signal to electromagnet 38 is discontinued. When it is desired to establish motion in the original direction, the above sequence is reversed with the drive assembly being drawn into engagement with clutch facing 19 upon momentary energization of electromagnet 37.

The following alternative embodiment shown in FIGS. 3 through 8 have certain elements which are common to some or all of the embodiments disclosed herein. In order to avoid unnecessary repetition of verbal detail and to point out structural parallels, whenever possible, the common elements in the various embodiments are assigned numbers differing by factors of 100 between the embodiments. Moreover, in any given embodiment, all elements having a corresponding element in some other embodiment have a common numerical designation in the hundreds position. For example, in FIG. 1 there is shown a drive assembly 22 and a permanent magnet 28. The corresponding drive assembly and magnet are numbered, respectively, 222 and 228 in FIG. 3, 422 and 428 in FIG. 5, 622 and 628 in FIG. 7, etc.

DETAILED DESCRIPTION OF THE APPARATUS SHOWN IN FIG. 3

Figure 3:
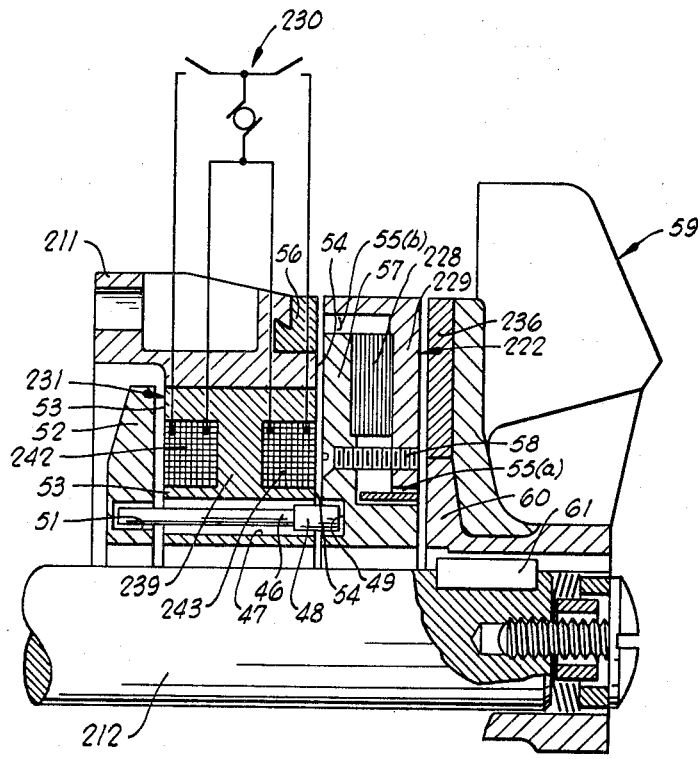
FIG. 3 is a partial cross-sectional view of an alternative embodiment of the present invention which includes apparatus for engaging and disengaging a brake, which apparatus utilizes an electromagnetically attracted force plate to cause engagement of the brake.

The apparatus shown in FIG. 3 differs from that previously disclosed inasmuch as it includes a drive assembly 222 which is not keyed to rotary shaft 212, but which is, instead, held by three pins 46 (only one of which is shown) against rotary motion relative to a second power transmitting assembly, such as a fixed brake assembly 231. Three pins 46 are free to slide within their respective apertures 47 formed in brake assembly 231, while the enlarged head portions 48 of the three pins are fixed into the three respective blind apertures 49 formed in a portion of drive assembly 222 to prevent relative rotational motion between the drive assembly and the brake assembly. Similarly, the opposite ends of pins 46 are secured within a blind aperture 51 carried by a movable, annular, counter plate 52, at least a portion of which is formed from ferromagnetic material, so that the counter plate, pin, and drive assembly 222 move as a unit relative to brake assembly 231.

As in previous embodiments, brake assembly 231 is secured to a fixed housing 211 and includes a pair of oppositely acting annular field coils 242 ad 243 which are controlled by electrical control means 230 and are carried by a single, annular, yoke iron 238 having a roughly H-shaped cross-sectional configuration. As viewed in FIG. 3, the left-hand portion of yoke iron 239 is formed into a pair of annular pole surfaces 53 for field coil 242, while the right-hand portion of the yoke iron is formed into a similar pair of annular pole surfaces 54 for field coil 243. Yoke iron 239 is secured to fixed housing 211, which also carries therein a ring 56 which is made of ferromagnetic material.

Ring 56 is positioned within housing 211 immediately adjacent a portion of an annular clutch-brake engaging member 229 which has a cross-sectional configuration approximating that of an L. In addition, the radially inward portion of ring 56, as shown in FIG. 3, is adjacent the radially outward portion of a magnet carrier plate 57 which, as in the case of the clutch brake engaging member 229, has a cross-sectional configuration approximating that of an L and which is separated from member 229 by air gaps 55(a) and 55(b). A bolt 58, preferably made from diamagnetic material, is utilized to hold an annular permanent magnet 22 between clutch brake engaging member 229 and magnetic carrier plate 57 to complete the rigid drive assembly 222.

On the left of drive assembly 222, as viewed in FIG. 3, there is provided a first force transmitting assembly, such as a fan assembly 59, of an electric motor (not shown). The fan assembly is rigidly secured to shaft 212 by means of a key 61 projecting into a slot formed in a brake plate 60 which forms a portion of fan assembly 59. The left-hand part of the fan assembly includes an annular brake shoe 236 which is positioned to engage clutch brake engaging member 229.

OPERATION OF THE APPARATUS SHOWN IN FIG. 3

In considering the operation of the apparatus shown in FIG. 3, let it first be assumed that the apparatus is in its inoperative position, that is, with drive assembly 222 held in engagement with brake assembly 231 by means of permanent magnet 228. At such time as it is desired to apply braking action to fan assembly 59 and thus to shaft 212, field coil 242 is momentarily pulsed by electrical control means 230 to create a momentary electromagnetic field in the area of pole surfaces 53 whereupon counter plate 52 is attracted to the right, as viewed in the drawing. As the counter plate moves, it carries with it pins 46 which thereupon push drive assembly 222 away from brake assembly 231 and into engagement with brake shoe 236. Thereupon a magnetic circuit is formed for permanent magnet 228 which includes, in addition to the permanent magnet, a portion of brake plate 60 and the radially inward portions of magnetic carrier plate 57 and clutch brake engagement member 229.

Braking action is thereupon applied to fan 59 due to the frictional forces on brake shoe 236, which arise from the fact that drive assembly 222 is precluded from rotary motion parallel to that of fan assembly 59 due to the locking action of pins 46.

In order to disengage the brake, the above procedure is reversed and field coil 243 is pulsed from electric control means 230 to create a momentary electromagnetic field in the area of pole surfaces 54 to attract drive assembly 222 back into engagement with brake assembly 231. Thereupon a magnetic circuit is formed for permanent magnet 228 which includes, in addition to the permanent magnet, the cross section of ring 56 and the radially inward portions of magnetic carrier plate 57 and clutch-brake engagement member 229 with the hoop-like extension. The drive assembly is thereafter maintained in this position until field coil 242 is once again pulsed.

DETAILED DESCRIPTION OF THE APPARATUS SHOWN IN FIG. 4

Figure 4:
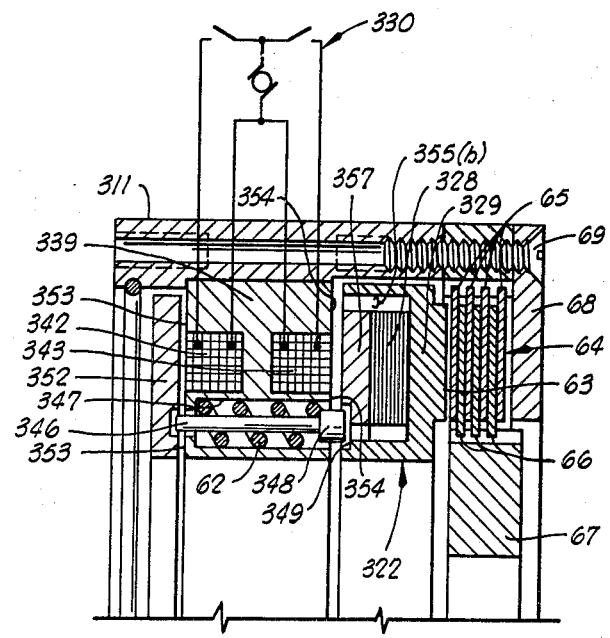
FIG. 4 is a fragmentary cross-sectional view of an alternative embodiment of the present invention which includes apparatus similar to that shown in FIG. 3 wherein a laminar brake is utilized to provide braking action to a power input ring.

The apparatus shown in FIG. 4 is similar in operation to that shown in FIG. 3 inasmuch as a pair of oppositely acting field coils are utilized to move a drive assembly into and out of engagement with a brake plate. Unlike the structure shown in FIG. 3, however, that of FIG. 4 does not utilize magnetic force to maintain the engagement of the drive assembly with the brake, but rather utilizes the thrust furnished by a compression spring for this purpose. More particularly, in the instant embodiment field coils 342 and 343 are connected to electrical control means 330 and are carried within a yoke iron 339 which is secured to a fixed housing 311. As in the previously described structure, there is provided a counter plate 352 to which is secured one end of three pins 346 (only one of which is shown) slidably positioned within apertures 347 formed in yoke iron 339. Unlike the previous structure, however, surrounding each pin 346 there is provided a relatively strong compression spring 62 which acts against an enlarged head 348 of each pin to urge the pin in a right-hand direction. The outer segment of the enlarge head of the pin is secured within a blind aperture 349 formed within a fixed assembly 322.

Fixed assembly 322 includes an annular permanent magnet 328 which is secured between a ring-shaped magnet carrire plate 357 and an annular clutch-brake engaging member 329 having a generally U-shaped configuration with the arms of the U pointing toward yoke iron 339. An air gap 355(b) separates plate 357 from member 329. An annular projection 63 is formed on member 329 on the central portion of the U adjacent to an ordinary laminar brake assembly, indicated generally by the numeral 64.

The laminar brake assembly 64 comprises a plurality of annular discs 65 which are keyed in the well-known manner to a portion of housing 311 whereby they may be moved toward and away from each other but may not rotate relative to each other. In a similar manner, a plurality of discs 66 are keyed to a power input ring 67 and alternate with discs 65. An annular force plate 68 is rigidly positioned on housing 311 by means of bolts 69 (only one of which is shown) on the side of assembly 64 opposite projection 63 carried by member 329.

OPERATION OF THE APPARATUS SHOWN IN FIG. 4

In considering the operation of the above-disclosed apparatus, let it be assumed that fixed assembly 322 is being held in contact with yoke iron 339 by permanent magnet 328. Under these circumstances the force transmitted to the fixed assembly by coil springs 62 acting through pins 346 is insufficient to break the magnetic circuit. When it is desired to engage the brake and overcome the rotary power being put into the system through ring 67 from a rotary shaft (not shown), field coil 342 is momentarily pulsed to attract counter plate 352 toward yoke iron 339. The magnetic circuit between the yoke iron and fixed assembly 322 is thereupon broken and the drive assembly is forced toward assembly 64 whereupon projection 63 engages the brake assembly 64 to move the discs 65 and 66 together and against force plate 68, thereby applying a retarding force to power input ring 67. The continuing action of coil springs 62 operating through pins 346 and fixed assembly 322 holds the brake in application until such time as field coil 343 is pulsed in an opposite direction to overcome the action of the coil spring and move the fixed assembly once more into engagement with yoke iron 339. It will, of course, be appreciated that, as in the case of the structure shown in FIG. 3, the fixed assembly 322 is prevented from rotating relative to the yoke iron 339 due to the locking action of pins 346.

DETAILED DESCRIPTION OF THE APPARATUS SHOWN IN FIG. 5

In the apparatus disclosed heretofore, a pair of oppositely acting field coils have been utilized to position the fixed assembly in alternate stable working conditions. It is not, however, necessary to utilize a pair of field coils. Instead, by properly designing the yoke iron, a single such field coil can be utilized to position the fixed assembly so long as means are provided for pulsing the single field coil in opposite directions whereby first an attracting and then a repelling electromagnetic force is transmitted by the field coil to the permanent magnet. Such a mechanism is shown in FIG. 5, the elements of which are quite similar to those previously discussed in relation to FIG. 4.

Figure 5:
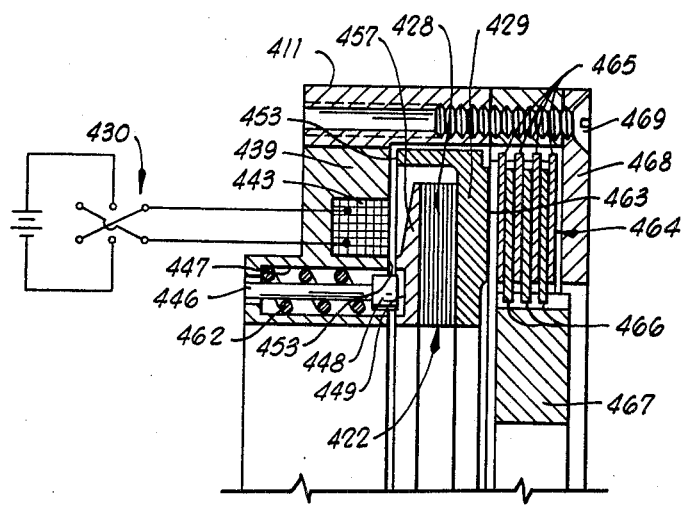
FIG. 5 is a fragmentary cross-sectional view of an alternative embodiment of the present invention which includes apparatus similar to FIG. 4 wherein a single electromagnet is provided to alternately attract and repel a portion of the apparatus which includes a permanent magnet to engage and disengage the laminar brake.

In FIG. 5, the power input to the system is from a shaft (not shown) acting through a power input hub or ring 467 to which are secured discs 466 in a standard disc clutch assembly 464. Other discs 465 within the clutch assembly 464 are held by an interior surface of a housing 411 adjacent a thrust plate 468 which is secured to the housing by means of a bolt 469. Likewise secured to housing 411 is a yoke iron 439 which carries a single field coil 443. Suitable electric control means 430 are provided for pulsing the field coil first in one direction and then in the other to create an electromagnetic field across a pair of annular pole surfaces 453 formed by a portion of yoke iron 439.

A fixed assembly, indicated generally at 422, is positioned to move between brake assembly 464 and yoke iron 439 and includes a generally L shaped clutch-brake engaging member having a projection 463 formed thereon to engage disc clutch assembly 464. A permanent magnet 428 is secured to the clutch-brake engaging member and is likewise secured to a magnet carrier plate 457.

Means substantially identical to the corresponding means shown in FIG. 4 are provided for urging fixed assembly 442 into engagement wtih bracket assembly 464. These means include pins 446 (only one of which is shown) slidably positioned within apertures 447 (only one of which is shown) formed within yoke iron 439. Enlarged heads 448 are formed on pins 446 and are engaged by compression springs 462 which surround the pins within apertures 447. Magnet carrier plate 457 is provided with a blind aperture 449 into which head 448 is rigidly secured so that fixed assembly 422 and pins 446 move as a single unit.

OPERATION OF THE APPARATUS SHOWN IN FIG. 5

The operation of this apparatus is, in many details, identical to that of the apparatus shown in FIG. 4. For instance, when the fixed assembly 422 is in its left-hand position, the elements of the brake assembly 464 are disengaged to allow relative motion between power input ring 467 and the stationary housing 411. Moreover, while fixed assembly 422 can move toward and away from yoke iron 439, it is restrained against rotary motion with respect to the yoke iron due to the locking action of pins 446.

With the fixed assembly 422 in its left-hand position, the action of springs 462 is overcome by the force of permanent magnet 428. When it is desired to engage the brake 464, field coil 443 is pulsed by control means 430 in such a manner as to create a momentary electromagnetic field in the area of pole surfaces 453 which opposes the magnetic field of permanent magnet 428 and breaks the magnetic circuit which has held the fixed assembly in a left-hand position. Thereupon the fixed assembly moves to the right and extension 463 engages brake assembly 464 due to the force of springs 462 acting through pins 446 and fixed assembly 422 to engage the brake and retard the motion of ring 467. The brake assembly is held in this engaged position until field coil 443 is pulsed in an opposite direction to attract the permanent magnet and move fixed assembly 422 against the action of springs 462 back into engagement with the yoke iron 439. At this juncture, the permanent magnet re-establishes its previous magnetic circuit with the yoke iron to hold the fixed assembly in a stable position abutting the yoke iron.

DETAILED DESCRIPTION OF THE APPARATUS SHOWN IN FIG. 6

Figure 6:
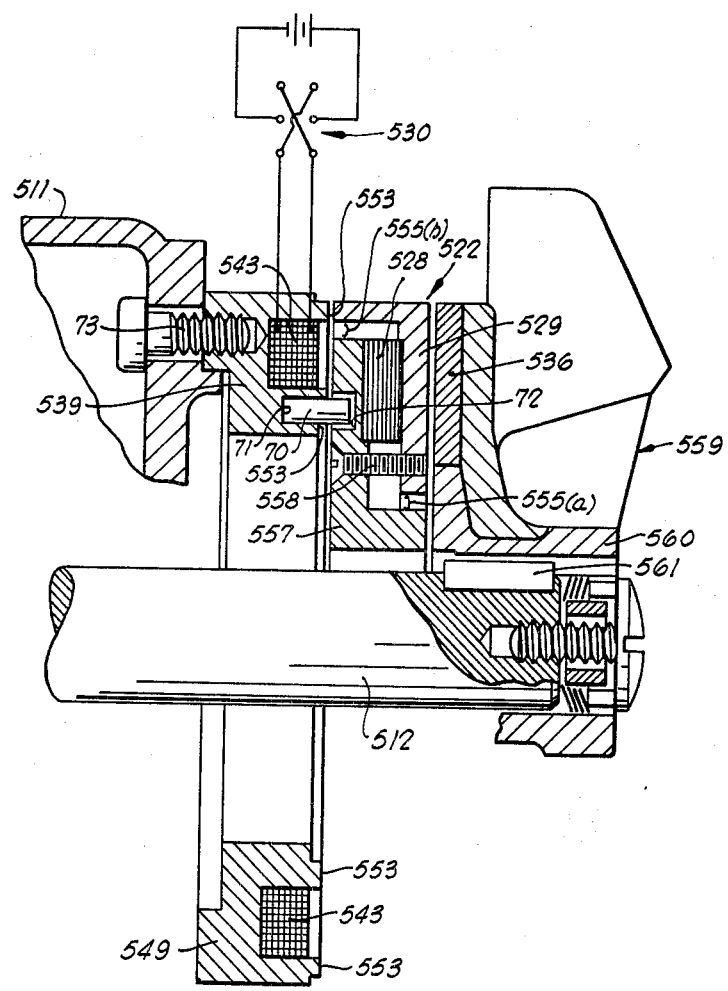
FIG. 6 is a partial cross-sectional view of an alternative embodiment of the present invention which includes apparatus for engaging and disengaging a brake which apparatus utilizes a permanent magnet and a single electromagnet to alternately position the permanent magnet. Means are shown for locking the portion of the apparatus containing the permanent magnet against rotation relative to the portion of the apparatus containing the electromagnet.

In FIG. 6 there is disclosed an alternative embodiment of apparatus for applying a brake to a driven member, which apparatus utilizes a permanent magnet to hold a portion of the apparatus alternately in one of two stable positions. Additionally, a single field coil is pulsed in opposite directions to move the portion of the structure including the permanent magnet into each of its alternate positions.

More particularly, in FIG. 6 there is shown a fan assembly 559 which forms a portion of an electric motor (not shown). The fan assembly is rigidly keyed to a shaft 512 by means such as a key 561 projecting into a slot formed in a brake element 560 which forms a portion of the fan assembly. An annular brake shoe 536 is carried on a portion of the left-hand surface of fan assembly 559 radially outward from element 560 in a position to engage an annular clutch-brake engaging member 529 which forms a portion of a movable drive assembly 522.

Also included within the drive assembly is an annular permanent magnet 528 and an annular magnet carrier plate 557 which is separated from member 529 by air gaps 555(a) and 555 (b). As in the structure shown in FIG. 3, the magnet carrier plate 557 and the clutch-brake engaging member 529 are held together as a rigid unit by means of bolts 558. Immediately adjacent the left-hand portion of drive assembly 522 is a pair of annular pole surfaces 553 formed on the surface of a yoke iron 539. A field coil 543 is secured within yoke iron 539 in such a manner so as to create an electromagnetic field in the area of pole surfaces 553 whenever the coil is energized by electrical control means 530.

A pin 70 is rigidly secured within a blind aperture 71 formed in the yoke iron and projects outwardly therefrom into a recess 72 formed in magnet carrier plate 557. Recess 72 is dimensioned slightly larger than the external diameter of pin 70 so as to allow motion of drive assembly 522 toward and away from yoke iron 539 while at the same time precluding relative rotary motion between the yoke iron and the drive assembly due to the projection of the pin within recess 72.

Anchor means, such as a bolt 73, is provided for rigidly holding yoke iron 539 to a fixed housing 511.

OPERATION OF THE APPARATUS SHOWN IN FIG. 6

The apparatus shown in FIG. 6 has primary utility for applying braking action to shaft 512 through the rotating fan assembly 559. Such braking action is accomplished in this manner—initially assume that drive assembly 522 is at its left-hand position where it is held in engagement with yoke iron 539 by means of permanent magnet 528 operating in an obvious magnetic path. When field coil 543 is pulsed in such a direction as to create an electromagnetic field in the area of pole surfaces 553 to repel drive assembly 522, the permanent magnetic circuit holding the drive assembly in its left-hand position is broken and the drive assembly slides relative to pin 70 into engagement with fan assembly 559 with the pin remaining in recess 72. At this point, clutch-brake engaging member 529 is held against brake shoe 536 due to the action of permanent magnet 528 operating through an obvious closed magnetic force path when in this position. The yoke iron 539 is maintained in this position by the permanent magnet until the coil 543 is pulsed in an opposite direction to attract drive assembly 522 again to the right into a stable position abutting yoke iron 539.

DETAILED DESCRIPTION OF THE APPARATUS SHOWN IN FIG. 7.

Figure 7:
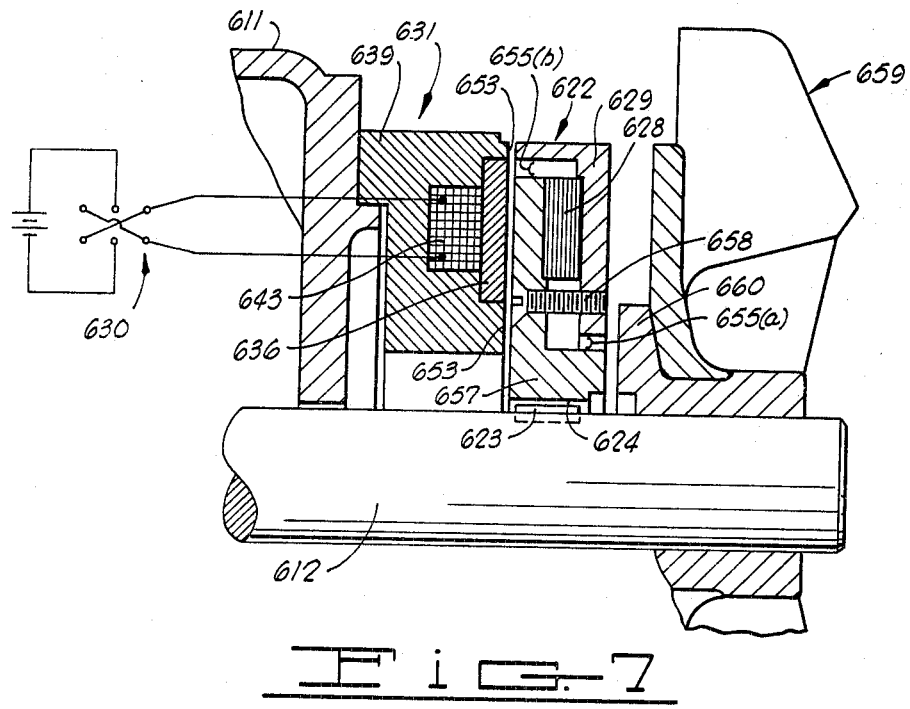
FIG. 7 is a partial cross-sectional view of apparatus similar to that shown in FIG. 6 wherein the portion of the apparatus containing the permanent magnet is not positively locked against rotation relative to the portion of the apparatus which includes the electromagnet.

The structure shown in FIG. 7 is useful for alternately engaging and disengaging a brake to control the rotary motion of a shaft 612. One significant difference between this structure and that previously described lies in the fact that in the present embodiment the yoke iron has annexed thereto the brake shoe. On the right-hand portion of shaft 612, as viewed in FIG. 7, is rigidly secured a fan assembly indicated generally by the numeral 659 which forms a portion of an electric motor (not shown) and which includes a drive plate 660. Adjacent the fan assembly there is provided a drive assembly 622 which is maintained on shaft 612 through a key 623 which projects into a key slot 624 formed in the drive assembly. Key slot 624 is oversized to allow relative motion between shaft 612 and drive assembly 622 is allowed in a direction parallel to the axis of rotation of the shaft while relative rotary motion between these two elements is prevented.

Drive assembly 622 comprises the same basic elements included within drive assembly 222, as shown in FIG. 3. More particularly, the drive assembly includes a clutch-brake engaging member 629 having a generally L-shaped configuration in cross section, and a permanent magnet carrier plate 657 which likewise has a generally L-shaped configuration in cross section and which has formed therein the key slot 624. A bolt 658 secures both the permanent magnet carrier plate and the clutch brake engaging member rigidly to a ring shaped permanent magnet 628 in such a position as to provide air gaps 655(a) and 655(b) between elements 629 and 657.

When drive assembly 622 is in its left-hand position, as viewed in FIG. 7, it engages a brake assembly 631 comprising a yoke iron 639 which partially surrounds a field coil 643 and which is formed to provide a pair of annular pole surfaces 653. Abutting the field coil and likewise partially surrounded by yoke iron 639 is an annular brake shoe 636. Brake assembly 631 is secured rigidly to a fixed housing 611, while electric control means 630 are provided for pulsing field coil 643 in opposite directions to provide a temporary electromagnetic field in the area of pole surfaces 653 to alternately repel and attract drive assembly 622 to disengage and engage the brake, respectively.

OPERATION OF THE APPARATUS SHOWN IN FIG. 7

The operation of the apparatus shown in FIG. 7 can best be understood by assuming that power assembly 622 is initially held against fan assembly 659 by the action of permanent magnet 628 which creates a closed magnetic path including a portion of drive plate 660. When electric control means 630 is pulsed in a direction so that field coil 643 creates a magnetic field to attract drive assembly 622, the magnetic circuit holding the drive assembly in the right-hand position is broken and the drive assembly thereupon moves to the left into engagement with brake shoe 636. In this position a closed magnetic field is set up by permanent magnet 628 through pole surfaces 653 and yoke iron 639 to rigidly maintain firm contact between drive assembly 622 and brake assembly 631. Braking force is thereupon transmitted from the brake shoe to shaft 612 through drive assembly 622 and key 623. In order to disengage the brake, field coil 643 is pulsed in the opposite direction by electric control means 630 to repel the drive assembly from brake shoe 636 back into engagement with a portion of fan assembly 659.

STRUCTURE AND OPERATION OF THE APPARATUS SHOWN IN FIG. 8

Figure 8:
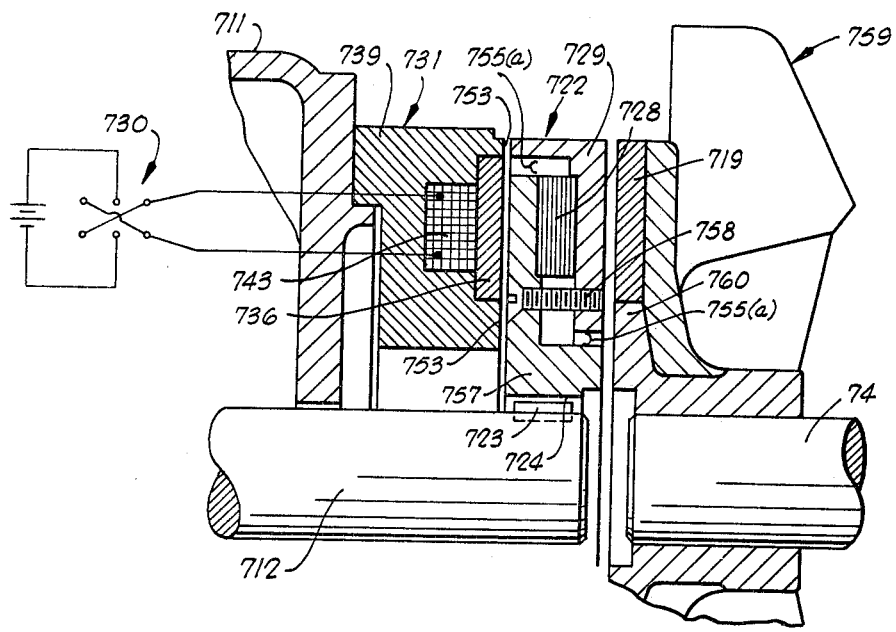
FIG. 8 is a partial cross-sectional view showing the apparatus disclosed in FIG. 7 adapted to be utilized as a shaft coupling.

The apparatus which was described above in relation to FIG. 7 may be utilized in a shaft coupling as shown in FIG. 8. A detailed description of each of the elements in this embodiment will not be presented inasmuch as the construction of the apparatus is identical to that shown in FIG. 7 except that shaft 712 projects toward fan assembly 759 only slightly beyond key 723. Aligned with shaft 712 is a power input shaft 74 which is rigidly secured to fan assembly 759 through drive plate 760. Radially outward from drive plate 760 there is provided a radial clutch facing 719 rigidly secured to the fan assembly which engages drive assembly 722 when the drive assembly is in its right-hand position, as shown in FIG. 8.

The apparatus of FIG. 8 operates in the same manner described above for the operation of the structure shown in FIG. 7 with field coil 743 being pulsed in one direction to repel drive assembly 722 whereupon power is transmitted through clutch facing 719 through the drive assembly and key 723 to shaft 712. Alternately, field coil 743 is pulsed to move drive assembly 722 into engagement with brake assembly 731 whereby braking action is transmitted to shaft 712 from drive assembly 722 acting through key 723.

In considering the various embodiments which have been disclosed in this application, it will be appreciated that other modifications of structure embodying the basic inventive concept wherein a power assembly formed at least in part from ferromagnetic material is provided in combination with cooperating structure also containing ferromagnetic elements may be conceived without necessitating further inventive effort. For instance, most, if not all, of the structure shown in FIGS. 1 through 6 can be modified slightly to operate as a shaft coupling in the manner in which the structure of FIG. 7 was modified to function as a shaft coupling, as disclosed in FIG. 8. Or the paramagnetic elements of the drive assembly, rather than being rigidly secured to act as a unit, may, with obvious modifications of other portions of the structure, be designed to operate as a clutch. Similar modifications may be made for other purposes wherein various elements from different embodiments may be combined to function in the same basic manner of the disclosed embodiments to produce an equivalent result. Moreover, it will be appreciated that the figures disclosed herein have, for the most part, consisted of fragmentary cross-sectional views of one portion of a radial system; thus, in the complete system, certain elements, such as pin 56 and bolt 58, may be repeated at intervals around the central shaft 612. Similarly, rather than a single permanent magnet, a plurality of smaller magnets may be used in an annular arrangement. The number and position of elements such as these may be chosen as a matter of routine by those skilled in the art and, as such, form no part of the present invention.

Having thus fully disclosed my invention, what I claim is:

1. A braking assembly comprising:
   a driven rotary member;
   a brake assembly operatively connected to said rotary member;
   a fixed assembly positioned adjacent said brake assembly for motion toward and away from said brake assembly, said fixed assembly comprising:

a brake engaging member having formed thereon a surface for engaging said brake assembly;

a permanent magnet secured to said brake engaging member on a side thereof opposite the brake assembly; and a magnet carrier plate fixed to said magnet and spaced from said brake engaging member, a portion of said plate being shaped to form a portion of a closed magnetic path with a portion of the yoke iron hereinafter defined when the fixed assembly is in contact with said yoke iron; and a yoke iron positioned on the side of said fixed assembly opposite said brake assembly, said yoke iron having formed therein an aperture;

a pin slidably received within said aperture, one end of said pin being secured to the magnet carrier plate;

means in operative engagement with said pin urging the pin in a direction toward the fixed assembly; and electromagnetic means including said yoke iron for alternately moving said fixed assembly toward and away from said yoke assembly to respectively disengage and engage said brake assembly.

2. The apparatus defined in claim 1 wherein said electromagnetic means includes a field coil operatively connected to a source of direct current and means for interrupting and reversing the flow of direct current to the field coil.

3. The apparatus defined in claim 2 wherein said means for urging the pin comprises a coiled compression spring carried within the aperture formed in the yoke iron.

4. The apparatus defined in claim 3 further characterized to include a stationary force plate positioned on a side of said brake assembly opposite the fixed assembly and wherein said brake assembly comprises a disc brake which is engaged upon the fixed assembly being urged toward the force plate by the action of said coiled spring.

5. The apparatus defined in claim 1 further characterized to include a counter plate secured to the end of the pin opposite the fixed assembly and in a position within the electromagnetic field from the electromagnetic means.

6. The apparatus defined in claim 5 wherein said electromagnetic means comprises a pair of field coils carried by said yoke iron, one of said field coils being positioned within said yoke iron immediately adjacent the fixed assembly and the other of said field coils being positioned on the opposite side of the yoke iron adjacent the counter plate.

7. The apparatus defined in claim 6 wherein said means for urging the pin comprises a coiled compression spring carried within the aperture formed in the yoke iron.

8. The apparatus defined in claim 7 further characterized to include a stationary force plate positioned on a side of said brake assembly opposite the fixed assembly and wherein said brake assembly comprises a disc brake which is engaged upon the fixed assembly being urged toward the force plate by the action of said coiled spring.

References Cited

UNITED STATES PATENTS

| | | | |
|---|---|---|---|
| 2,823,776 | 2/1958 | Pierce | 192—18.2 |
| 2,848,085 | 8/1958 | Mannaioni | 192—18.2 XR |
| 2,886,149 | 5/1959 | Baermann | 192—18.2 |
| 2,962,143 | 11/1960 | Heinemann. | |

BENJAMIN W. WYCHE III, Primary Examiner

U.S. Cl. X.R.

188—171; 192—18, 48.2, 84